United States Patent [19]

Pippert

[11] Patent Number: 4,991,857
[45] Date of Patent: Feb. 12, 1991

[54] STUFFING BOX ASSEMBLY

[75] Inventor: Frederick B. Pippert, Houston, Tex.

[73] Assignee: Utex Industries, Inc., Houston, Tex.

[21] Appl. No.: 440,497

[22] Filed: Nov. 22, 1989

[51] Int. Cl.$^5$ .............................................. F16J 15/18
[52] U.S. Cl. .................................... 277/102; 277/123
[58] Field of Search ............... 277/102, 105, 106, 110, 277/112, 123, 60, 62, 64, 175, 177

[56] References Cited

U.S. PATENT DOCUMENTS

| | | | |
|---|---|---|---|
| 2,567,479 | 9/1951 | Hebard | 277/105 |
| 3,608,912 | 9/1971 | Templin et al. | 277/123 |
| 3,982,765 | 9/1976 | Fickelscher et al. | 277/106 |
| 4,645,212 | 2/1987 | Lundholm | 277/102 |
| 4,702,482 | 10/1987 | Oseman | 277/177 |

Primary Examiner—Allan N. Shoap
Assistant Examiner—Daniel G. DePumpo
Attorney, Agent, or Firm—Browning, Bushman, Anderson & Brookhart

[57] ABSTRACT

A stuffing box assembly comprising a body which has a bore defined by a generally cylindrical wall and a shaft extending concentrically through the bore. A sleeve is disposed in the bore in surrounding relationship to the shaft, the sleeve having a cylindrical portion and an annular flange, the sleeve defining an annulus between the cylindrical portion and the wall defining a bore. At least one and preferably several annular members formed of an elastomeric material are disposed in the annulus. A stop means limits movement of the annular member away from the flange portion of the sleeve, the annular members being disposed between the flange portion and the stop means. One or more seals or packings for sealing between the shaft and the wall are disposed between the shaft and the wall on the opposite side of the flange portion from the annular member. An adjustable packing gland or the like urges the seal or packings against the flange portion of the sleeve such that the annular member is compressed and exerts a reactive force against the flange portion, the annular members also serving to form a seal between the wall and the cylindrical portion of the sleeve.

4 Claims, 1 Drawing Sheet

STUFFING BOX ASSEMBLY

BACKGROUND OF THE INVENTION

1. Field of the Invention

The present invention relates to a stuffing box assembly and, more particularly, to a stuffing box assembly wherein the packing or seal between a movable shaft and the stuffing box through which the shaft extends is energized.

2. Description of the Background

As is well known, in stuffing box assemblies used to seal between a movable shaft, i.e. reciprocating or rotating, and the stuffing box housing, a packing is disposed between the shaft, piston or the like and the wall of a bore in a housing which forms the stuffing box. In order to effect fluid-tight sealing between the stuffing box and the shaft, the packing is axially compressed to bring it into inner and outer radial engagement with the shaft and stuffing box wall, respectively. Most frequently, this is accomplished by means of an adjustable gland which can be advanced into an annulus formed between the shaft and the stuffing box wall and against the packing, the packing being restrained from any substantial axial movement away from the gland by means of a stop, usually in the form of an annular shoulder. In this arrangement, as the packing wears, leakage can occur past the packing, either along the wall of the stuffing box or between the shaft and the packing or between the shaft and the packing. In order to solve this problem, it has been proposed to energize the packing in such a fashion that, as the packing wears, it is continuously axially biased resulting in radially inwardly and outwardly expansion to thereby maintain its sealing efficiency and prevent leakage from one side of the packing to the other.

U.S. Pat. No. 3,982,765 shows a piston pump in which a coil spring is used to energize packing rings disposed between the stuffing box and the shaft. U.S. Pat. No. 3,608,912 shows a seal assembly for a valve stem in which annular, resilient seal members, e.g. O-rings, are received in a pocket formed between a liner which surrounds the valve shaft and an internal, cylindrical wall formed in the neck of the valve. The resilient members shown in U.S. Pat. No. 3,608,912 are employed to exert a radially inward force against the liner sleeve and are not used as an energization method for an axially displaced seal, e.g. packing rings.

SUMMARY OF THE INVENTION

It is therefore an object of the present invention to provide an improved stuffing box assembly.

Another object of the present invention is to provide an improved stuffing box assembly which utilizes an annular member or ring formed of an elastomeric or resilient material as an energization means for the stuffing box packing.

The above and other objects of the present invention will become apparent from the drawings, the description given herein and the appended claims.

The stuffing box assembly of the present invention includes a body or stuffing box having a bore which is defined by a generally cylindrical wall. A shaft, which can be reciprocating or rotating relative to the stuffing box, extends concentrically through the bore. A sleeve is disposed in the bore in relatively movable, i.e. reciprocating or rotating, surrounding relationship to the shaft. The sleeve includes a cylindrical portion and an annular, radially outwardly extending flange portion. An annulus is formed between the cylindrical portion and the wall defining the bore. At least one annular member which is formed of an elastomeric or resilient material is disposed in the annulus. There are stop means to limit movement of the annular member away from the flange portion of the sleeve, the annular member being disposed between the flange portion and the stop means. The seal, which may comprise one or more seal rings or packings for sealing between the shaft and the wall, is disposed between the shaft and the wall on the opposite side of the flange portion from the annular member. There are also means, e.g. an adjustable packing gland, to urge the seal toward the flange portion such that the annular member is compressed and exerts a reactive force against the flange portion. The annular member also serves to form a seal between the wall of the stuffing box and the cylindrical portion of the sleeve.

DESCRIPTION OF THE PREFERRED EMBODIMENTS

While the present invention will be described with particular reference to a stuffing box assembly for sealing around a shaft in which the shaft undergoes reciprocable motion, it is to be understood that the assembly can be used in any environment where it is desired to seal against fluid leakage between a relatively movable shaft, i.e. reciprocating or rotating, and a housing, e.g. a stuffing box.

Figure 1:
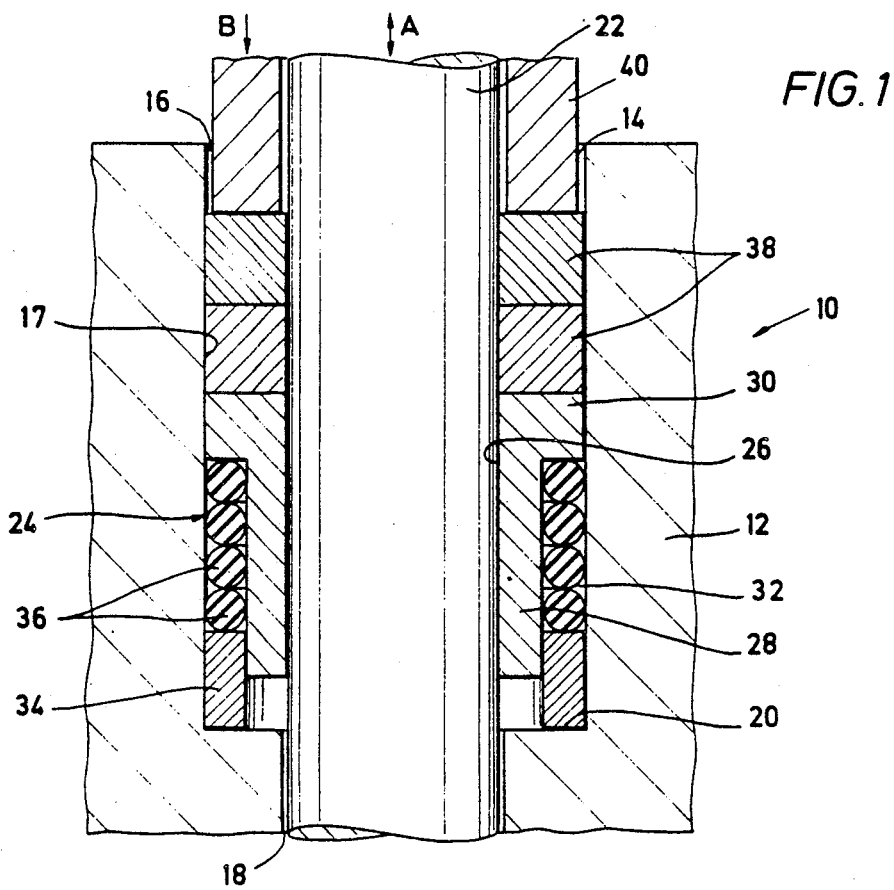
FIG. 1 is an elevational view, partly in section, showing the stuffing box assembly of the present invention with the energizing rings in the relaxed condition.

Referring first to FIG. 1, the stuffing box assembly, shown generally as 10, includes a stuffing box housing 12 having a bore 14. Bore 14 has a larger diameter cylindrical portion 16 defined by a cylindrical wall 17 and a smaller diameter cylindrical portion 18, an annular shoulder 20 being formed at the intersection of portions 16 and 18. A shaft 22 which reciprocates in the direction of arrow A is disposed generally concentrically in bore 14.

A sleeve 24 is in surrounding, relatively movable relationship with shaft 22, shaft 22 being received in a cylindrical bore 26 in sleeve 24 formed by cylindrical portion 28 of sleeve 24 and an annular flange portion 30 adjoined to cylindrical portion 28 and extending generally radially, outwardly therefrom. Accordingly, an annulus 32 is formed between the wall 17 forming bore portion 16 and the cylindrical portion 28 of collar 24. A stop ring 34 is disposed in bore portion 16 and abuts shoulder 20. As shown, stop ring 34 has a portion which extends into the annulus 32 formed between annular wall 17 and cylindrical portion 28 of sleeve 24. Nested in annulus 32 between flange portion 30 and stop ring 34 are a series of elastomeric O-ring 36, in the embodiment shown there being four of such O-rings.

Packing rings or seals 38 rest on flange portion 30, i.e. on the opposite side of flange portion 30 from annular elastomeric members 36. Seal members 38 serve to provide sealing between shaft 22 and wall 17 defining bore portion 16. To this end, an adjustable gland 40 is used to exert force in the direction shown by arrow B so as to compress seal rings or packings 38 between adjustable gland 40 and flange portion 30. Adjustable glands are well known to those skilled in the art and need not be described in detail here.

Figure 2:
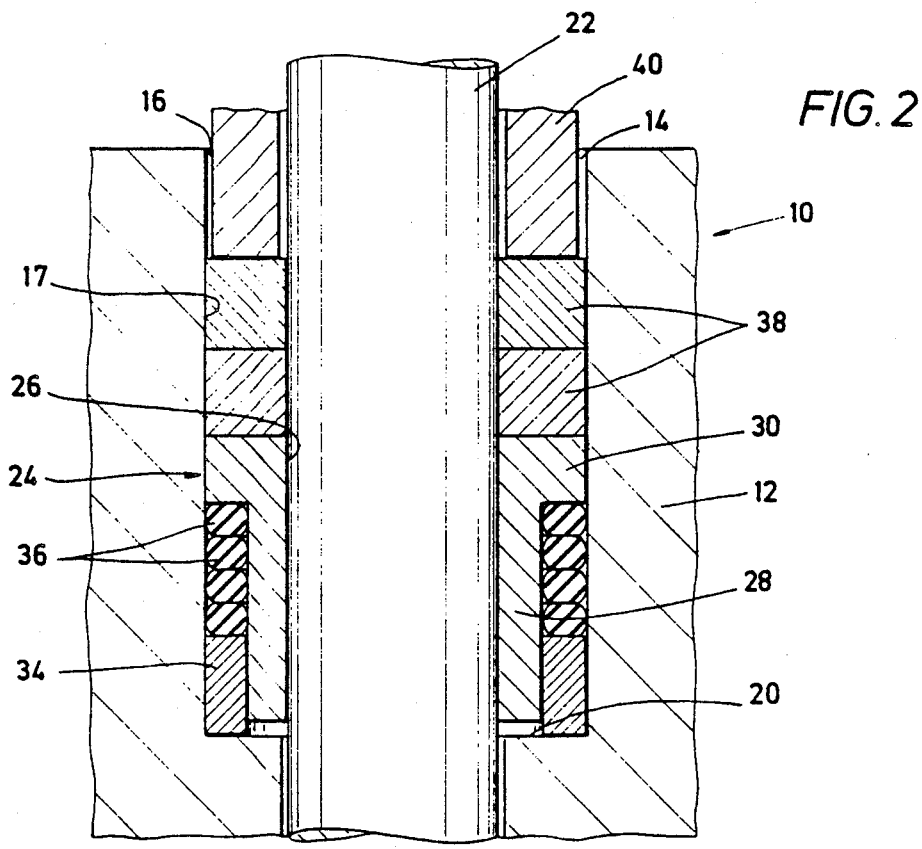
FIG. 2 is a view similar to FIG. 1 showing the energizing rings in the compressed, energizing position.

FIG. 1 shows the stuffing box assembly in the relaxed condition, i.e. when the resilient annular members 36 have not been energized. Referring now to FIG. 2, the annular elastomeric rings 36 are shown as being energized. To this end, adjustable gland 40 is moved in the direction of arrow B which simultaneously acts to compress seals or packings 38 between adjustable packing gland 40 and annular flange 30 of sleeve 24 resulting in radially inner and outer, sealing contact between the seals 38 and shaft 22 and wall 17, respectively. At the same time, annular, elastomeric members 36 are compressed between flange portion 30 and stop ring 34. The compression of annular elastomeric members 36 results in members 36 exterting a reactive force in the direction opposite to the direction of arrow B, i.e. against flange portion 30. As will be appreciated, stop ring 34, in engagement with shoulder 20, acts as a stop to allow the compressive force exerted by adjustable gland 40 and the reactive force exerted by annular elastomeric rings 36. It will thus be observed that although adjustable gland 40 may be in a fixed position, as packings or seals 38 wear, annular, elastomeric members 36 will continue to exert a force against flange protion 30 and hence packings 38 to constantly ensure that packings 38 are in engagement with wall 17 and shaft 22. Thus, sealing effected by packing 38 can be maintained without constant adjustment of adjustable gland 40.

It should be observed that since annular, elastomeric members 36 are disposed in the annulus 32 between the wall 17 and the cylindrical portion 28 of sleeve 24, they are maintained out of contact with shaft 22. Accordingly, the stuffing box assembly permits constant energization of the primary packings or seals 38 without impeding the movement of shaft 22 relative to stuffing box 12. It will be appreciated that if annular, elastomeric members 36 were in engagement with shaft 22, the frictional loading upon shaft 22 would be greatly increased resulting in excessive wearing of the members 36 and unnecessary drag on shaft 22.

Annular elastomeric members 36 also serve as a flow restriction to the extent that when in the compressed or energized state as shown in FIG. 2, members 36 form a seal between wall 17 and cylindrical portion 28. This restricts the leakage path to the space between sleeve 24 and shaft 22.

While the annular, elastomeric members 36 have been shown as O-rings, i.e. circular in cross section, it will be appreciated that any cross-sectional configuration will suffice. Thus, oval, square, etc. cross-sectional configurations of the annular members 36 can be employed. It will also be appreciated that the annular members 36 can be monolithic or can be of the split ring variety, although monolithic structures are employed to enhance the sealing effectiveness between the sleeve 24 and the stuffing box 10.

The annular members 36 can be made from any material which is elastomeric, as that term is commonly used, i.e. a material which can be deformed under pressure but will return substantially to its original configuration when the pressure is removed. Thus, the material of construction of the members 36 can be of synthetic or natural material, such as natural rubber, synthetic rubber, mixture of synthetic or natural rubber with various fillers, various other synthetic polymeric materials, such as nitriles, fluorocarbon resins, silicone resins, as well as combinations of such materials, provided they possess sufficient elasticity under the use conditions to exert an energizing force on the packing or seals, alone and in admixture with natural or synthetic rubber with various fillers, extenders and the like. Obviously, the material of construction of the annular members 36 will be dictated by the type of service in which the stuffing box assembly is used.

While four annular members are shown in FIGS. 1 and 2, more or less of such annular members can be employed, it only being necessary to have at least one such annular elastomeric member. The use of elastomeric, annular members 36 to energize packings in the stuffing box assembly of the present invention is highly advantageous when compared with coil springs. Coil springs have to be accurately sized and therefore present inventory problems, whereas in the present invention, off-the-shelf O-rings or the like can be used. Moreover, coil springs do not provide any sealing capability to thereby restrict any potential leakage path to between the sleeve and the shaft.

It will be understood that the stop ring 34 can be dispensed with and an extension of shoulder 30 which projects into the annulus 32 employed at a stop. However, the use of a separate stop ring 34 provides clear advantages in minimizing the amount of machining required to form the bore which receives the shaft and packing assembly.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A stuffing box assembly comprising:
   a body having an axial bore defined by a generally cylindrical wall;
   a shaft extending concentrically through said bore;
   a sleeve disposed in said bore in relatively movable, surrounding relationship to said shaft, said sleeve including a cylindrical portion and an annular, radially outwardly extending flange portion, an annulus being formed between said cylindrical portion and said wall;
   at least one annular member formed of an elastomeric material disposed in said annulus;
   stop means to limit movement of said annular member away from said flange portion, said stop means including a portion extending into said annulus, said annular member being disposed between said flange portion and said stop means, said sleeve being axially movable relative to said stop means;
   a seal for sealing between said shaft and said wall, said seal being disposed between said shaft and said wall on the opposite side of said flange portion from said annular member; and
   means to urge said seal against said flange portion whereby said annular member is compressed and exerts a reactive force against said flange portion, said annular member serving to form a seal between said wall and said cylindrical portion of said sleeve when compressed.

2. The stuffing box assembly of claim 1 wherein said annular member comprises an O-ring.

3. The stuffing box assembly of claim 1 wherein said bore includes a larger diameter portion and a smaller diameter portion, an annular shoulder being formed at the intersection of said larger diameter portion and said smaller diameter portion, said stop means including an annular ring in engagement with said shoulder'

4. The stuffing box assembly of claim 1 wherein the are a plurality of said annular members disposed in said annulus.

* * * * *